United States Patent
Byrd et al.

(10) Patent No.: US 9,052,828 B2
(45) Date of Patent: Jun. 9, 2015

(54) OPTIMAL VOLUME PLACEMENT ACROSS REMOTE REPLICATION RELATIONSHIPS

(71) Applicant: International Business Machines Corporation, Armonk, NY (US)

(72) Inventors: Stephen A. Byrd, Sunnyvale, CA (US); Benjamin J. Randall, Fort Collins, CO (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 13/906,746

(22) Filed: May 31, 2013

(65) Prior Publication Data

US 2014/0359243 A1    Dec. 4, 2014

(51) Int. Cl.
G06F 12/02    (2006.01)
G06F 3/06    (2006.01)

(52) U.S. Cl.
CPC ............ *G06F 3/0629* (2013.01); *G06F 3/0604* (2013.01); *G06F 3/0683* (2013.01)

(58) Field of Classification Search
CPC .... G06F 3/0629; G06F 3/0604; G06F 3/0683
See application file for complete search history.

(56) References Cited

U.S. PATENT DOCUMENTS

| | | | |
|---|---|---|---|
| 8,060,714 B1 | 11/2011 | Natanzon | |
| 8,352,678 B2 | 1/2013 | Furuhashi | |
| 2006/0161810 A1 | 7/2006 | Bao | |
| 2007/0113034 A1 | 5/2007 | Maruyama et al. | |
| 2009/0100108 A1* | 4/2009 | Chen et al. | 707/610 |
| 2009/0158284 A1 | 6/2009 | Bi et al. | |
| 2009/0276771 A1 | 11/2009 | Nickolov et al. | |
| 2012/0259961 A1 | 10/2012 | Winokur | |
| 2014/0059307 A1* | 2/2014 | Blea et al. | 711/162 |

OTHER PUBLICATIONS

Mirzoev, Timur, "Synchronous Replication of Remote Storage", The Technology Interface Journal/Winter Special Issue vol. 10 No. 2, 2009, http://technologyinterface.nmsu.edu/Winter09/, 7 pages.

* cited by examiner

*Primary Examiner* — Hiep Nguyen
(74) *Attorney, Agent, or Firm* — Stephen R. Tkacs; Stephen J. Walder, Jr.; Feb R. Cabrasawan

(57) ABSTRACT

A mechanism is provided in a data processing system for volume placement across remote replication relationships. Responsive to applying a volume placement optimization to a source storage pool having at least one volume with a replication target in a target storage pool, the mechanism determines whether the source storage pool and the target storage pool have identical storage volume membership. Responsive to determining the source storage pool and the target storage pool not having the same storage volume membership, the mechanism generates workload performance data for each non-shared storage volume in the target storage pool that does not have a corresponding member of the source storage pool. The mechanism generates a hardware profile for hardware of the target storage pool. The mechanism generates a volume placement optimization for the storage volumes in the target storage pool based on the workload performance data for each non-shared storage volume in the target storage pool and the hardware profile for the hardware of the target storage pool.

20 Claims, 5 Drawing Sheets

US 9,052,828 B2

OPTIMAL VOLUME PLACEMENT ACROSS REMOTE REPLICATION RELATIONSHIPS

BACKGROUND

The present application relates generally to an improved data processing apparatus and method and more specifically to mechanisms for optimal volume placement across remote replication relationships.

A storage area network (SAN) is a dedicated network that provides access to consolidated, block level data storage. SANs are primarily used to make storage devices accessible to servers so that the devices appear like locally attached devices to the operating system. A SAN typically has its own network of storage devices that are generally not accessible through the local area network by other devices.

Hierarchical storage management (HSM), also referred to as tiering, is a data storage technique that automatically moves data between high-cost and low-cost storage media. HSM systems exist because high-speed storage devices, such as hard disk drive arrays or even solid-state drives, are more expensive (per byte stored) than slower devices, such as optical discs and magnetic tape drives. While it would be ideal to have all data available on high-speed devices all the time, this is prohibitively expensive for many organizations. Instead, HSM systems store the bulk of the enterprise's data on slower devices, and then copy data to faster disk drives when needed. In effect, HSM turns the fast disk drives into caches for the slower mass storage devices. The HSM system monitors the way data is used and makes best guesses as to which data can safely be moved to slower devices and which data should stay on the fast devices.

In a typical HSM scenario, data files that are frequently used are stored on disk drives, but are eventually migrated to tape if they are not used for a certain period of time, typically a few months. If a user does reuse a file which is on tape, it is automatically moved back to disk storage. The advantage is that the total amount of stored data can be much larger than the capacity of the disk storage available, but since only rarely-used files are on tape, most users will usually not notice any slowdown.

SUMMARY

In one illustrative embodiment, a method, in a data processing system, is provided for volume placement across remote replication relationships. The method comprises responsive to applying a volume placement optimization to a source storage pool having at least one volume with a replication target in a target storage pool, determining whether the source storage pool and the target storage pool have identical storage volume membership. The method further comprises responsive to determining the source storage pool and the target storage pool not having the same storage volume membership, generating workload performance data for each non-shared storage volume in the target storage pool that does not have a corresponding member of the source storage pool. The method further comprises generating a hardware profile for hardware of the target storage pool. The method further comprises generating a volume placement optimization for the storage volumes in the target storage pool based on the workload performance data for each non-shared storage volume in the target storage pool and the hardware profile for the hardware of the target storage pool.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
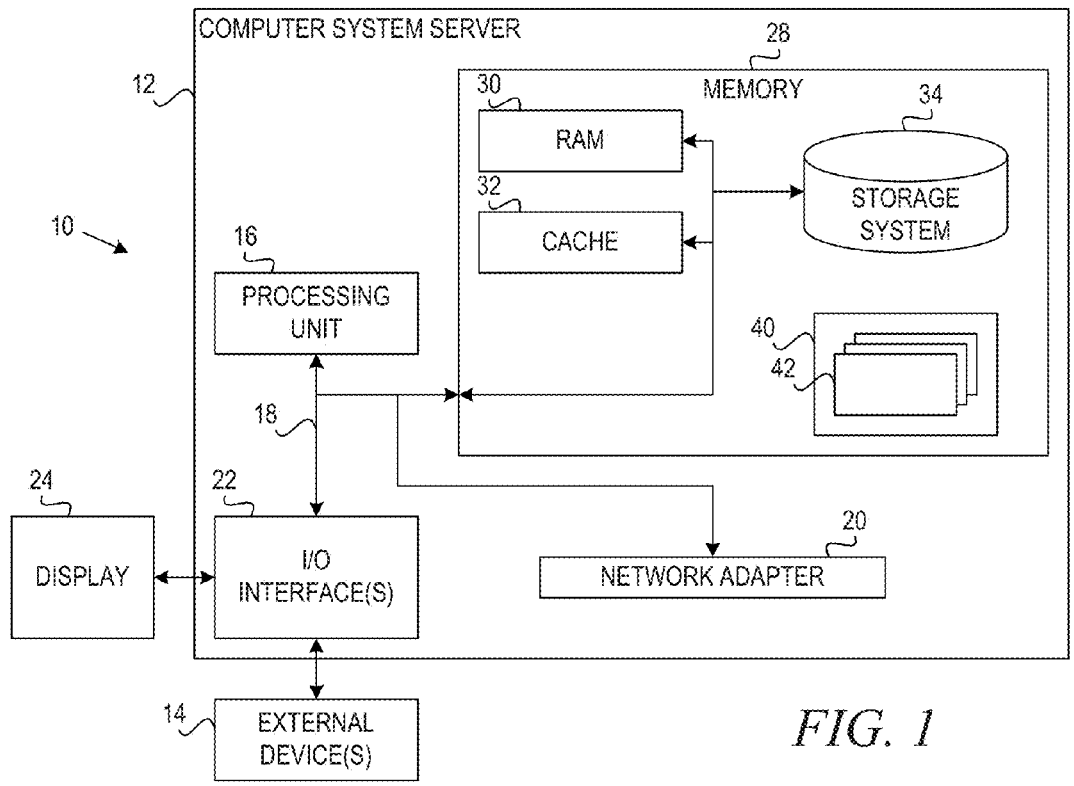
FIG. 1 depicts a cloud computing node according to an illustrative embodiment.

Performance of storage area network (SAN) attached storage is critical for assuring that applications receive proper response times. To achieve optimal performance, the technique of optimization is sometimes employed in order to determine the best pool in which a volume can be placed. By examining the performance characteristics of a set of volumes and pools, recommendations can be provided regarding where the volumes should be placed. For example, a particular volume may be sitting in a high tier pool, even though it is rarely accessed. This volume could be migrated to a lower tier space. Alternatively, a volume may be located in a low tier pool but receive input/output (IO) demands that can only be met by moving it to a pool of a higher tier.

While automated solutions exist for optimized volume placement, no solutions account for optimal placement of remote replication targets. This can lead to issues in the event that a failover occurs and replication targets become active primary volumes. While the original primary volumes may have been property optimized for characteristic host IO, the secondary volumes are likely to still be in their original location, potentially inhabiting pools that are unable to meet the demands of host IO.

These non-optimal volume placements in the recovery site further degrade performance during a failover and it may take some time before there is a chance to run and apply optimization algorithms. Delays may not be only due to considerations with regard to the failover, but also due to automated optimization solutions needing to gather enough performance data in order to determine optimal volume placement. Such issues and considerations could easily prevent automated optimization solutions from being run and applied for a significant number of days.

In accordance with an illustrative embodiment, an automated approach is provided for optimization of replication source and target volumes at the same time by appropriately using source system information to generate the necessary inputs to run the optimization solution on the target system, if necessary. The planning, and optional execution, of the optimization is executed in a single user flow, resulting in a configuration where both the source and target volumes are optimally placed. This means that before a failover occurs, the replication targets are already optimally placed within the target system to meet characteristic IO demands.

It is possible that the volume and pool configuration on the replication target storage systems do not match the configuration on the source storage systems. The invention accounts for this fact, allowing for optimization of the replication target, even in cases where preliminary target pool membership and/or hardware differ greatly from that of the source. Some examples of how source and target configurations could vary are as follows:

1. The pool set up for the replication source storage system is identical to the target storage system. The volume membership inside each of the pools is also identical.

2. The pool set up for the replication source storage system is identical to the target storage system, but the volume membership inside each of the pools is different.

3. The pool set up for the replication source storage system differs from the target storage system, but the volume membership inside the pools is identical.

4. The pool set up on the replication source storage system differs from the target storage system and volume membership also differs.

In the above list, the "pool set up" references both the hardware configurations of the storage pools and relevant pool or subsystem specific configuration options. "Volume membership" similarity is based on mirrored relationships. For both source and target storage system pools to have the same "volume membership," all volumes in the source pool must have replication target volumes in the target pool and the target pool must have no additional volumes.

The invention is able to account for different degrees of variability between pool setup and volume membership. It does this by detecting the set of relevant differences and then applying the optimization algorithm to the target volumes with inputs that account for these differences.

The illustrative embodiments do not cover any specific optimization algorithm or type of input. Even though the steps described herein necessarily reference work needed to generate inputs, specifically performance information, based on the differences detected, these references should not be considered exhaustive as a given optimization algorithm may well require additional inputs that would be treated in the manner described in this disclosure.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least live characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, hut are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
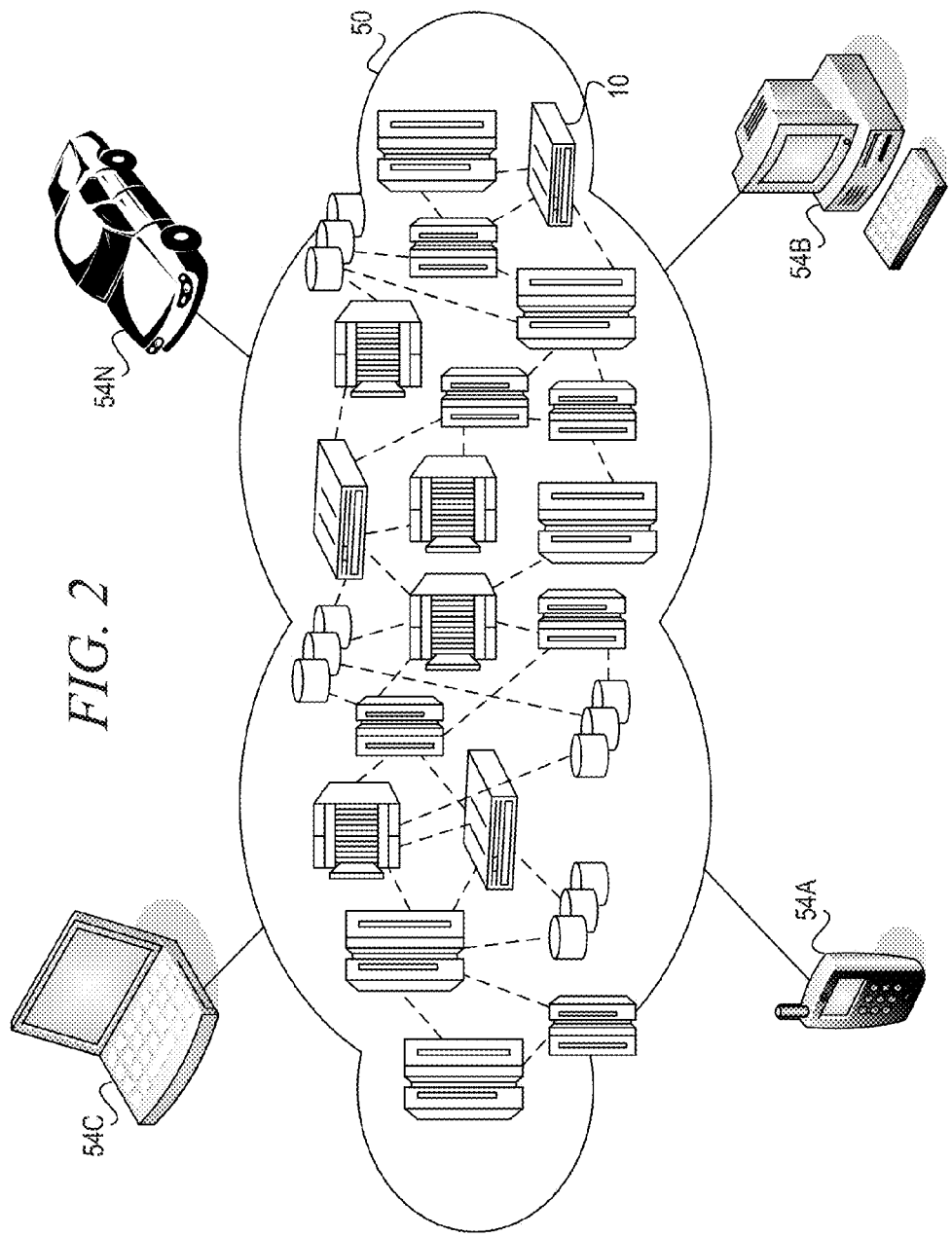
FIG. 2 depicts a cloud computing environment according an illustrative embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
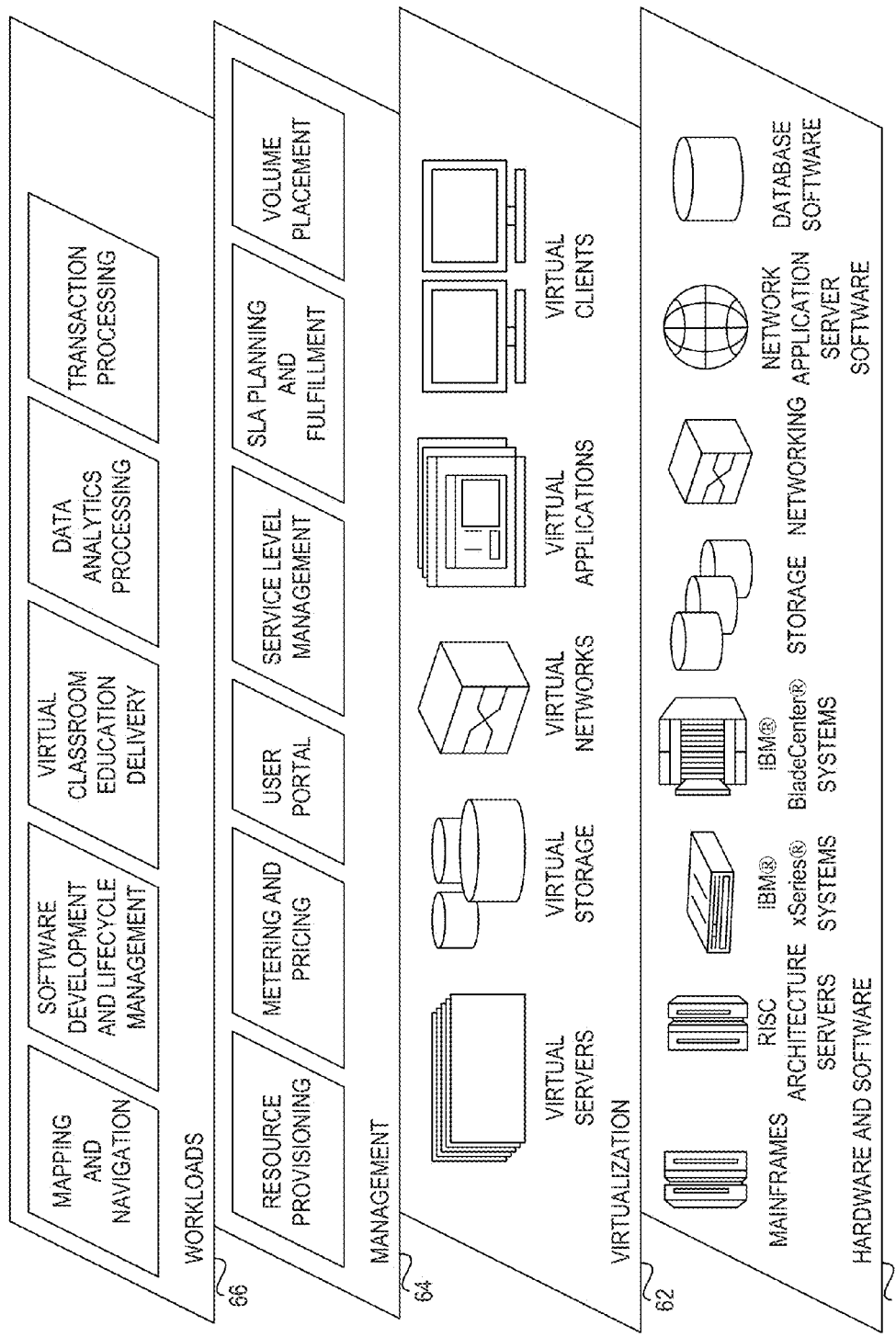
FIG. 3 depicts abstraction model layers according to an illustrative embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software, (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; and data analytics processing; transaction processing.

In accordance with an illustrative embodiment, management layer 64 may provide volume placement, which provides an automated approach for optimization of replication source and target volumes at the same time by appropriately using source system information to generate the necessary inputs to run the optimization solution on the target system. Volume placement accounts for different degrees of variability between pool setup and volume membership by detecting the set of relevant differences and then applying the optimization algorithm to the target volumes with inputs that account for these differences.

In one embodiment, volume placement is an application that queries and maintains information from storage systems, such as a volume and pool catalog, capacity information, performance information, and replication relationships configuration. The application stores information for all storage systems in an environment, such that the application has information on all storage systems involved in remote copy relationships. The application provides an interface to the use such that the user may issue commands against one or more storage systems to optimize sets of volumes.

The user may initiate an optimization action for a set of volumes. This can be done via direct specification of the volumes or via specification of a volume container, such as a storage pool, storage system, or a customized grouping. This triggers the system to detect an optimal placement for the selected volumes. At a minimum, this is done by using historic performance data for the selected volumes, as well as the containing pool(s) within the storage system(s). The underlying optimization system may use more inputs, which the system covers in the same fashion as performance data.

The volume placement application determines an optimal placement for the volumes such that the pools in which they are placed meet the performance needs of the selected volumes. This approach can be used for a variety of use cases, including up-tiering, down-tiering, and balancing volumes across storage pools. The user may specify certain parameters that can be used to control the optimization. The end result of the action is that a plan is created specifying where to move improperly placed volumes.

The above action is confined to a set of pools—the pools that the volume selected currently resides within and the pools into which the volumes are recommended to be moved. Volumes contained within any of these pools will be referred to as "impacted volumes" as their performance will be impacted by the optimization. Note that the impacted volumes list potentially includes volumes that were not part of the user selection.

Each volume in the impacted volumes list is analyzed to determine if it has a replication relationship. The pools containing any replication targets are noted and examined. These pools are called the "target pools." The application determines if the source pools and target pools have identical setup. This is done by looking at the hardware on which the pools depend as well as any relevant configuration options. This may be the physical disks and redundant array of independent disk (RAID) arrays that make up the pool, or in the case of a storage virtualizer, the mDisks that make up the pool and the characteristics of the storage systems on which those mDisks are hosted. Similarly, this may include configuration settings enabling various subsystem options.

The application may also determine if the volume membership is identical between the source and target pools. Volume membership is determined to be identical if all of the following conditions apply: each volume in a source pool has a replication target in a target pool; and, there are no volumes in the target pools that do not have a relationship with a volume in the source pools. If the volume membership of the source and target pools is identical and the source pools and target pools are identical, then volume migrations that are planned for the optimization of the source volumes will be made for the target volumes such that the resulting volume membership of the source and target pools is identical following the migration.

Figure 4:
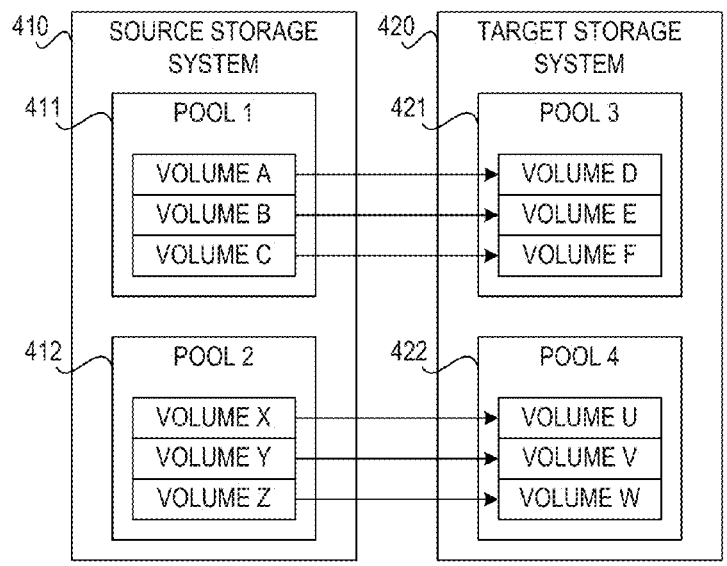
FIG. 4 depicts an identical volume configuration before optimization in accordance with an illustrative embodiment.

FIG. 4 depicts an identical volume configuration before optimization in accordance with an illustrative embodiment. Source storage system 410 includes storage pool 1 411 and storage pool 2 412. Storage pool 1 411 includes volume A, volume B, and volume C. Storage pool 2 412 includes volume X, volume Y, and volume Z. Tiering categorizes available storage based on performance capabilities. Higher tiers have higher performance, and lower tiers have tower cost. In example embodiment, each storage pool may be given a tier designation. Thus, storage pool 1 411 may be categorized in a higher tier, and storage pool 2 412 may be categorized in a lower tier.

Target storage system 420 includes storage pool 3 421 and storage pool 4 422. Storage pool 3 421 includes volume D, volume E, and volume F. Storage pool 4 422 includes volume U, volume V, and volume W. In the depicted example, each volume in storage pool 1 411 has a replication target in storage pool 3 421, and each volume in storage pool 2 412 has a replication target in storage pool 4 422. In, other words, the volumes in storage pool 1 411 have a replication or remote copy relationship with the volumes in storage pool 3 421, and the volumes in storage pool 2 412 have a replication or remote copy relationship with the volumes in storage pool 4 422.

Figure 5:
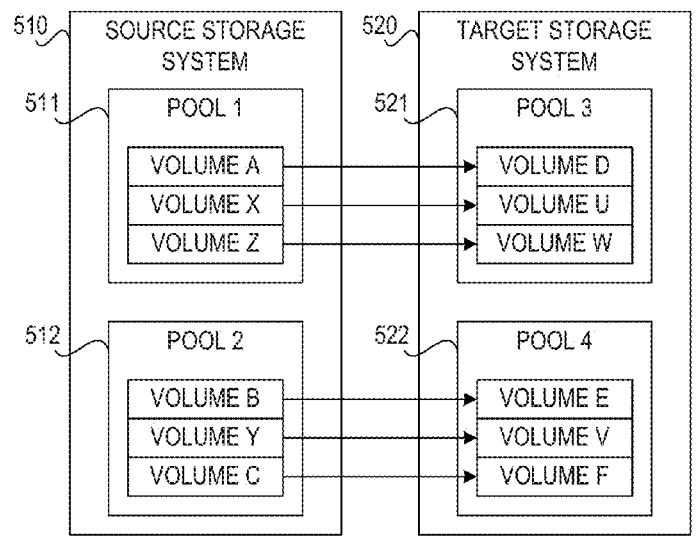
FIG. 5 depicts an identical volume configuration after optimization in accordance with an illustrative embodiment.

FIG. 5 depicts an identical volume configuration after optimization in accordance with an illustrative embodiment. After a volume placement optimization action, source storage system 510 includes storage pool 1 511 and storage pool 2 512. Storage pool 1 511 includes volume A, volume X, and volume Z. Storage pool 2 512 includes volume B, volume Y, and volume C. After the volume placement optimization action, target storage system 520 includes storage pool 3 521 and storage pool 4 522. Storage pool 3 521 includes volume D, volume U, and volume W. Storage pool 4 522 includes volume E, volume V, and volume F.

Therefore, in the depicted example, volume X and volume Z are migrated to storage pool 1 511, and volume B and volume C are migrated to storage pool 2 512. Because of the replication relationships, volume U and volume W are migrated to pool 521, and volume E and volume F are migrated to storage pool 522.

Figure 6:
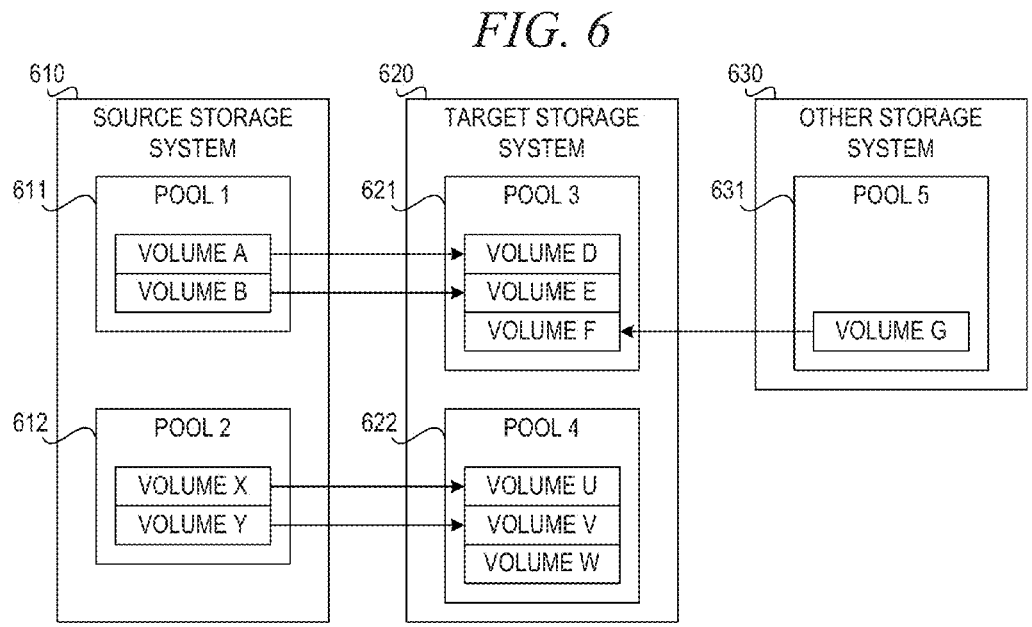
FIG. 6 depicts non-identical volume membership in accordance with an illustrative embodiment.

FIG. 6 depicts non-identical volume membership in accordance with an illustrative embodiment. Source storage system 610 includes storage pool 1 611 and storage pool 2 612. Storage pool 1 611 includes volume A and volume B. Storage pool 2 612 includes volume X and volume Y. Target storage system 620 includes storage pool 3 621 and storage pool 4 622. Storage pool 3 621 includes volume D, volume E, and volume F. Storage pool 4 622 includes volume U, volume V, and volume W.

In the depicted example, each volume in storage pool 1 611 has a replication target in storage pool 3 621, and each volume in storage pool 2 612 has a replication target in storage pool 4 622. In other words, the volumes in storage pool 1 611 have a replication or remote copy relationship with the volumes in storage pool 3 621, and the volumes in storage pool 2 612 have a replication or remote copy relationship with the volumes in storage pool 4 622. There is another storage system 630, which includes storage pool 5 631. Storage pool 5 631 includes volume G, which has a replication target in storage pool 3 621. Therefore, in the depicted example, the source pool 611 and target pool 621 do not have identical volume membership. Also, the source pool 612 and target pool 622 do not have the same volume membership.

In the event the system detects the original volume membership is not identical or the source pool is not identical to the target pool, the system must run an optimization on the volumes within the target pools. However, as the copy targets are not necessarily receiving application IO at the same rate as the source volume, any performance data for the target volumes is suspect. The system handles this situation in the following manner.

All volumes in the target pools that have a relationship with volumes in the source pools inherit the performance observed for the volumes in the source pool. Volumes in the target pool that have no relationship with volumes in the source pool are handled in one of three ways: if the volume is the target of a relationship with a volume that is not part of the source pool, the volume inherits the performance of its source volume; if the volume is mapped to a host, the performance observed for the volume is used; and, if the volume is not mapped to a host and the volume is not the target of a copy services relationship, it is considered an inactive volume and is ignored.

The volume placement application creates the optimization plan for the target volumes using the consolidated performance measurements described above. In the event a target pool differs from the source pool, the theoretical performance capability of the target pool's hardware is used to predict performance.

Once the optimization plan has been created for both the source and target volumes, the user is given the capability to have the system execute the plans. This can be done at the same time or the two plans can be executed separately.

The volume placement of the illustrative embodiments can be applied to complex replication relationships, such as single source/multiple target and copy through solutions. This is done by calculating the optimization for each of the multiple targets using the appropriately generated and inherited performance metrics.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the tatter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 7:
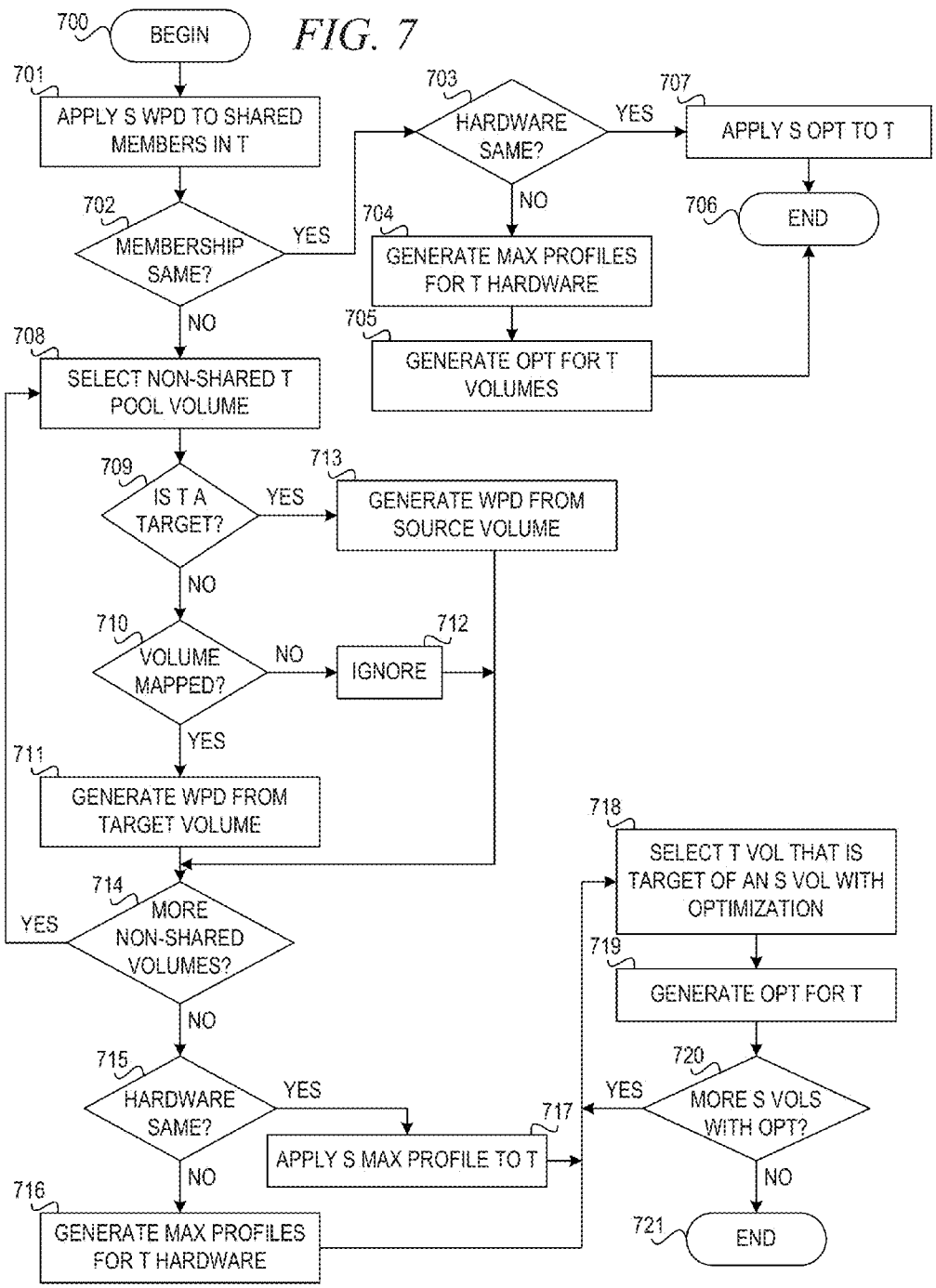
FIG. 7 is a flowchart illustrating operation of a volume placement mechanism in accordance with an illustrative embodiment.

FIG. 7 is a flowchart illustrating operation of a volume placement mechanism in accordance with an illustrative embodiment. Operation begins (block 700), and the volume placement mechanism applies the source entity's workload profile data (WPD) to the shared members in the target entity (block 701). The source entity and target entity may comprise a volume, containing pool or containing subsystem. The workload profile data comprises performance information gathered for the given entity or set of entities.

The mechanism then determines whether the source and target pool memberships are the same (block 702). If the memberships are the same, the mechanism determines whether the source and target pool hardware is the same (block 703). If the hardware is not the same, the mechanism generates profiles of the maximum performance capabilities of the target pool hardware (block 704) and generates a volume placement optimization for the target volumes (block 705). Thereafter, operation ends (block 706). If the hardware is the same in block 703, the mechanism applies the source pool optimization to the target pool (block 707), and operation ends (block 706).

If the source and target pool memberships are different in block 702, the mechanism selects a non-shared target pool volume (block 708) and determines whether the selected volume is a target of a remote copy relationship with a volume that is not part of the source pool (block 709). If the selected volume is not a replication target, the mechanism determines whether the volume is mapped to a host (block 710). If the selected volume is mapped to a host, the mechanism generates workload profile data from the selected target volume (block 711). If the selected volume is not mapped to a host in block 710, the mechanism ignores the selected volume (block 712). If the selected volume is a target of a remote copy relationship with a volume that is not part of the source pool in block 709, the selected volume inherits the performance information of its source volume to generate the workload performance data (block 713).

Responsive to ignoring the selected volume in block 712 or generating the workload performance data in block 711 or block 713, the mechanism determines whether there are more non-shared volumes in the target pool (block 714). If there are more non-shared volumes, operation returns to block 708 to select a next non-shared volume in the target pool.

If there are no more non-shared volumes in the target pool in block 714, the mechanism determines whether the source and target pool hardware is the same (block 715). If the hardware is not the same, the mechanism generates profiles of the maximum performance capabilities of the target pool hardware (block 716). If the hardware is the same in block 715, the mechanism applies the source pool volume placement optimization to the target pool (block 717).

Responsive to generating the profiles of the maximum performance capabilities of the target pool hardware in block 716 or applying the source pool maximum performance capabilities profile to the target pool in block 717, the mechanism selects a target pool volume that is a replication target of a source volume with volume placement optimization (block 718). The mechanism then generates a volume placement optimization for the selected target volume (block 719). The mechanism determines whether more source pool volumes with volume placement optimizations exist (block 720). If more optimized source pool volumes exist, operation returns to block 718 to select a next target pool volume that is a replication target of a source pool volume with volume placement optimization. If no more optimized source pool volumes exist in block 720, then operation ends (block 721).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for volume placement, which provide an automated approach for optimization of replication source and target volumes at the same time by appropriately using source system information to generate the necessary inputs to run the optimization solution on the target system. The volume placement mechanism account for different degrees of variability between pool setup and volume membership by detecting the set of relevant differences and then applying the optimization algorithm to the target volumes with inputs that account for these differences.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for volume placement across remote replication relationships, the method comprising:
    responsive to applying volume placement optimization to a source storage pool having at least one volume with a replication target in a target storage pool, determining whether the source storage pool and the target storage pool have identical storage volume membership;
    responsive to determining the source storage pool and the target storage pool not having the same storage volume membership, generating workload performance data for each non-shared storage volume in the target storage pool that does not have a corresponding member of the source storage pool;
    generating a hardware profile for hardware of the target storage pool; and
    generating a volume placement optimization for the storage volumes in the target storage pool based on the workload performance data for each non-shared storage volume in the target storage pool and the hardware profile for the hardware of the target storage pool.

2. The method of claim 1, wherein generating workload performance data for each non-shared storage volume in the target storage pool that does not have a corresponding member of the source storage pool comprises:
    for a given non-shared storage volume in the target storage pool, determining whether the given non-shared storage volume is a replication target of a respective source storage volume in another storage pool; and
    responsive to determining the given non-shared storage volume is a replication target of a respective source storage volume, applying workload performance data of the respective source storage volume as the workload performance data of the given non-shared storage volume.

3. The method of claim 2, wherein generating workload performance data for each non-shared storage volume in the target storage pool that does not have a corresponding member of the source storage pool further comprises:
    responsive to determining the given non-shared storage volume is not mapped to a host, ignoring the given non-shared storage volume.

4. The method of claim 1, wherein generating the maximum performance capabilities profile for hardware of the target storage pool comprises:
    determining whether the source storage pool and the target storage pool have the same hardware; and
    responsive to determining the source storage pool and the target storage pool have the same hardware, applying a hardware profile for the hardware of the source storage pool as the hardware profile for the hardware of the target storage pool.

5. The method of claim 1, wherein the hardware profile of the hardware of the target storage pool defines maximum performance capabilities of the hardware of the target storage pool.

6. The method of claim 1, wherein generating a volume placement optimization for the storage volumes in the target storage pool comprises:
    for each given storage volume in the target storage pool that is a replication target of a respective storage volume in the source storage pool, generating a volume placement optimization for the given storage volume.

7. A computer program product comprising a computer readable storage medium having a computer readable program stored therein, wherein the computer readable program, when executed on a computing device, causes the computing device to:

responsive to applying a volume placement optimization to a source storage pool having at least one volume with a replication target in a target storage pool, determine whether the source storage pool and the target storage pool have identical storage volume membership;

responsive to determining the source storage pool and the target storage pool not having the same storage volume membership, generate workload performance data for each non-shared storage volume in the target storage pool that does not have a corresponding member of the source storage pool;

generate a hardware profile for hardware of the target storage pool; and generate a volume placement optimization for the storage volumes in the target storage pool based on the workload performance data for each non-shared storage volume in the target storage pool and the hardware profile for the hardware of the target storage pool.

8. The computer program product of claim 7, wherein generating workload performance data for each non-shared storage volume in the target storage pool that does not have a corresponding member of the source storage pool comprises:

for a given non-shared storage volume in the target storage pool, determining whether the given non-shared storage volume is a replication target of a respective source storage volume in another storage pool; and responsive to determining the given non-shared storage volume is a replication target of a respective source storage volume, applying workload performance data of the respective source storage volume as the workload performance data of the given non-shared storage volume.

9. The computer program product of claim 8, wherein generating workload performance data for each non-shared storage volume in the target storage pool that does not have a corresponding member of the source storage pool further comprises:

responsive to determining the given non-shared storage volume is not mapped to a host, ignoring the given non-shared storage volume.

10. The computer program product of claim 7, wherein generating the maximum performance capabilities profile for hardware of the target storage pool comprises:

determining whether the source storage pool and the target storage pool have the same hardware; and responsive to determining the source storage pool and the target storage pool have the same hardware, applying a hardware profile for the hardware of the source storage pool as the hardware profile for the hardware of the target storage pool.

11. The computer program product of claim 7, wherein the hardware profile of the hardware of the target storage pool defines maximum performance capabilities of the hardware of the target storage pool.

12. The computer program product of claim 7, wherein generating a volume placement optimization for the storage volumes in the target storage pool comprises:

for each given storage volume in the target storage pool that is a replication target of a respective storage volume in the source storage pool, generating a volume placement optimization for the given storage volume.

13. The computer program product of claim 7, wherein the computer readable program is stored in a computer readable storage medium in a data processing system and wherein the computer readable program was downloaded over a network from a remote data processing system.

14. The computer program product of claim 7, wherein the computer readable program is stored in a computer readable storage medium in a server data processing system and wherein the computer readable program is downloaded over a network to a remote data processing system for use in a computer readable storage medium with the remote system.

15. An apparatus, comprising:

a processor; and a memory coupled to the processor, wherein the memory comprises instructions which, when executed by the processor, cause the processor to:

responsive to applying a volume placement optimization to a source storage pool having at least one volume with a replication target in a target storage pool, determine whether the source storage pool and the target storage pool have identical storage volume membership;

responsive to determining the source storage pool and the target storage pool not having the same storage volume membership, generate workload performance data for each non-shared storage volume in the target storage pool that does not have a corresponding member of the source storage pool;

generate a hardware profile for hardware of the target storage pool; and generate a volume placement optimization for the storage volumes in the target storage pool based on the workload performance data for each non-shared storage volume in the target storage pool and the hardware profile for the hardware of the target storage pool.

16. The apparatus of claim 15, wherein generating workload performance data for each non-shared storage volume in the target storage pool that does not have a corresponding member of the source storage pool comprises:

for a given non-shared storage volume in the target storage pool, determining whether the given non-shared storage volume is a replication target of a respective source storage volume in another storage pool; and responsive to determining the given non-shared storage volume is a replication target of a respective source storage volume, applying workload performance data of the respective source storage volume as the workload performance data of the given non-shared storage volume.

17. The apparatus of claim 16, wherein generating workload performance data for each non-shared storage volume in the target storage pool that does not have a corresponding member of the source storage pool further comprises:

responsive to determining the given non-shared storage volume is not mapped to a host, ignoring the given non-shared storage volume.

18. The apparatus of claim 15, wherein generating the maximum performance capabilities profile for hardware of the target storage pool comprises:

determining whether the source storage pool and the target storage pool have the same hardware; and responsive to determining the source storage pool and the target storage pool have the same hardware, applying a hardware profile for the hardware of the source storage pool as the hardware profile for the hardware of the target storage pool.

19. The apparatus of claim 15, wherein the hardware profile of the hardware of the target storage pool defines maximum performance capabilities of the hardware of the target storage pool.

20. The apparatus of claim 15, wherein generating a volume placement optimization for the storage volumes in the target storage pool comprises:

for each given storage volume in the target storage pool that is a replication target of a respective storage volume in the source storage pool, generating a volume placement optimization for the given storage volume.

\* \* \* \* \*